No. 783,150. Patented February 21, 1905.

UNITED STATES PATENT OFFICE.

CLAUS A. SPRECKELS AND CHARLES A. KERN, OF NEW YORK, N. Y., ASSIGNORS, BY MESNE ASSIGNMENTS, TO FEDERAL SUGAR REFINING COMPANY, OF JERSEY CITY, NEW JERSEY, A CORPORATION OF NEW JERSEY.

SUGAR-CLEANSING COMPOSITION AND PROCESS OF MAKING SAME.

SPECIFICATION forming part of Letters Patent No. 783,150, dated February 21, 1905.

Application filed July 2, 1902. Serial No. 114,036.

*To all whom it may concern:*

Be it known that we, CLAUS A. SPRECKELS and CHARLES A. KERN, citizens of the United States, and residents of the borough of Manhattan, city and State of New York, have invented certain new and useful Improvements in Sugar-Cleansing Compositions and Processes of Making Same, of which the following is a full and true description.

The object of this invention is to produce a specific form of defecating or cleansing liquid which when mixed with sugar or sugar-bearing material will so thoroughly combine with and act upon the impurities contained in the material treated as to absorb out and carry with it when removed from the treated mass nearly all of said impurities without injuriously affecting the sugar.

In an application, Serial No. 82,825, for Letters Patent of the United States, filed by us November 19, 1901, we have described and claimed a compound body for cleansing sugar containing a sulfonated or sulfo-oleaginous body mixed with hydrocarbon oil, such as kerosene-oil or other form of petroleum or petroleum-oil. The present invention relates to a specific form of the cleansing-bodies described and claimed in said application and to the production thereof.

As stated in our Letters Patent No. 698,150, dated April 22, 1902, and in our Letters Patent Nos. 699,933 and 700,099, both dated May 13, 1902, as well as in our application aforesaid, sulfonated or sulfo-oleaginous derivatives may be produced by the action of sulfuric acid, preferably of 1.835 specific gravity, (66° Baumé,) upon bodies or mixtures, such as resins, rosin-oils, essential oils, fats, fatty acids, and fatty oils, and in such proportions that there is no injurious effect from the sulfuric acid, and a sulfonated fluid defecating or cleansing agent is produced. These liquids are non-solvent of sugar crystals and have greater absorbent properties for the earthy or metallic salts and for the invert sugar ordinarily found associated with impure sugar or sugar-bearing bodies and the caramel produced in the process of manufacture than the adherent properties of such substances for the sugar itself, and when separated from the sugar or sugar-bearing material the new cleansing liquids retain and carry off the absorbed impurities.

The present invention is limited to a specific form of the sulfonated or sulfo-oleaginous bodies referred to—viz., those sulfonated or sulfo-oleaginous bodies mixed with hydrocarbon oil, such as kerosene-oil or petroleum or petroleum derivative, and produced by subjecting fats, fatty oils, or fatty acids (or mixtures containing the same) to the action of sulfuric acid.

As stated in the said application and in the said patents, the fatty sulfonated or sulfo-oleaginous defecating or cleansing agents may be prepared as follows: We mix sulfuric acid, preferably of 1.835 specific gravity (66° Baumé) in the proportion of, say, fifty parts, by weight, of sulfuric acid with one hundred parts, by weight, of one or more fats, fatty oils, and fatty acids. The sulfuric acid is added to the body gradually, so as to maintain a low temperature, the work being preferably carried out in a cooled receptacle, and the mixture is allowed to stand for a few hours. The excess of acid is removed or neutralized either by the addition of alkali or by the addition of water and gravital separation. The proportion and strength of acid above suggested may be used in sulfonating each of the fatty substances hereinafter mentioned. The proportion and strength of acid may of course be varied in well-known ways, it being borne in mind that the result is that the body when acted upon by the sulfuric acid and in the condition in which it is to be used will not contain sulfuric acid in any amount injurious to the sugar and will have an absorbent property for the impurities, including invert sugar, greater than the adherence of such impurities to the sugar itself.

One form of fatty sulfonated or sulfo-oleaginous defecating or cleansing agent may be produced as follows: Take two parts, by weight, of a fatty body, refined cotton-seed oil being an example, and add while stirring the oil in a cooled receptacle one part, by weight, of sulfuric acid, (preferably 66° Baumé,) preferably mixing the acid with the oil gradually, or, at all events, under such conditions that a low temperature will be maintained and the fatty base will not be oxidized. After the incorporation of the acid allow the mixture to stand for a few hours and then preferably remove or neutralize the excess of acid in the mixture. For this purpose we may neutralize the mixture by the addition of an alkali or mixture of alkalies, preferably carbonate of soda, caustic soda, carbonate of potash, caustic potash, or mixtures thereof. When not neutralizing by the use of alkali, we proceed as follows: Add water about equal to the amount of oil in the original mixture and mix thoroughly. On standing the mixture separates into two layers, the upper fluid layer being the material in course of treatment and the lower, consisting of water, containing surplus acid and other useless products, and we leave the mixture standing for several hours in a vessel properly arranged and then draw off the water containing superfluous acid, &c. To the mixture obtained by the addition of alkalies as above described or by the addition of water as above described add a solution of common salt and water to free the mixture from any remaining acid or water or excess of alkali when used. After each addition of salt and water we allow the mixture to settle and draw off the saline solution. When the mixture is practically free from water or from excess of alkali when used, we completely dissolve the sulfonated or sulfo-oleaginous body in hydrocarbon oil or a mixture containing hydrocarbon oil. We prefer to employ kerosene-oil or other form of petroleum-oil or petroleum-body for this purpose. The hydrocarbon-oil mixture may be added at any time during the preparation of the fatty sulfonated or sulfo-oleaginous defecating or cleansing agent. In the case of palmitic acid, butyric acid, or stearic acid these substances may be liquefied to facilitate their treatment by the sulfuric acid or acid mixture by the addition of kerosene-oil. Ordinarily, however, the hydrocarbon oil or mixture will be added after we have sulfonated the fatty body or mixture.

A fatty sulfonated or sulfo-oleaginous cleansing or defecating liquid of the character hereinbefore described and dissolved in hydrocarbon oil or hydrocarbon-oil mixture, preferably petroleum or petroleum derivatives, has distinct characteristics and properties for the purpose of defecating or cleansing sugar and is also, so far as we have been able to learn, a composition new in the arts.

When employing alkali to neutralize the acid, we have obtained good results by employing one part of caustic soda to each fifteen parts of the modified mixture. We have obtained good results by adding about fifty per cent. of kerosene-oil; but we do not state this as a fixed percentage of the petroleum or petroleum derivative, since it may be materially varied.

The use of an alkali, above described, for the purpose of neutralizing free sulfuric acid in the sulfonated or sulfo-oleaginous body may result, as is well understood, in the production of sulfonic-acid salts or closely-allied salts in the cleansing liquid; but such salts so made are included by us under the general designation of "sulfonated" or "sulfo-oleaginous" cleansing or defecating liquids.

The following are fatty bodies which we have tested and found to act in the manner described, viz: olive-oil, castor-oil, cotton-seed oil, cocoanut-oil, linseed-oil, rape-oil, peanut-oil, lard, tallow, cod-liver oil, fish-oil, (menhaden-oil,) lard-oil, oleic acid, stearic acid, palmitic acid, butyric acid; but the substances above named are given as examples only of fatty or oily bodies which may be subjected to the action of sulfuric acid to produce a fatty sulfonated or sulfo-oleaginous cleansing or defecating liquid or compound of the character described.

Our invention, generically stated, includes not only defecating or cleansing liquids containing fatty sulfonated or sulfo-oleaginous bodies made as aforesaid, but also defecating or cleansing liquids containing sulfonated or sulfo-oleaginous bodies made by the subjection of mixtures containing fatty or oily bodies to the action of sulfuric acid or sulfuric-acid mixture. We have obtained good results from a considerable number of mixtures, of which the following may be cited as examples, first, rosin-oil, castor-oil, and oleic acid; second, castor-oil, cotton-seed oil, and oleic acid; third, lard and rosin oil; fourth, rosin-oil, oleic acid, and oil of turpentine; fifth, tallow and oil of turpentine.

As the fats are solid oils and as the fatty acids, as is well known, have oily or greasy characteristics and as all of the above substances or mixtures are acted upon by sulfuric acid in the manner described and also when sulfonated act on sugar and its impurities in analogous and equivalent ways, we hereinafter include them all under the generic term "fatty oleaginous bodies," and when acted on by sulfuric acid in the manner described we term the derivatives "fatty sulfo-oleaginous bodies." All the derivative cleansing agents mentioned are properly included also under the term "fatty sulfonated" bodies, whether properly and strictly called "oleaginous" or not.

The action of sulfuric acid upon the various fatty or oily bodies, examples of which are above given, while not identical, is sufficiently similar to class all of these bodies together in that they combine or become associated with the sulfuric acid in such a way as to form sulfonated fluid defecating or cleansing agents, including the recognized sulfonic acids, and to produce a resulting substance or compound which does not contain sulfuric acid in a form which is harmful to sugar, but which compound has an affinity or absorbent quality for the mineral or earthy salts and for the invert sugar and the caramel, which are the impurities most generally associated with sugar superior to the adherence of such substances to the sugar itself. The proportions may, however, be varied, provided that a defecating or cleansing liquid having the specified properties is produced. The exact character of the reaction produced by sulfuric acid on the bodies named differs of course somewhat with the character of the body treated, but the resulting product is for the purposes of this invention essentially the same in all cases and all the bodies above specified are equivalents for the purposes of our invention.

Methods of treatment of sugar or sugar solution by the use of sulfonated defecating or cleansing agents are described and claimed generically in our United States Letters Patent No. 698,150, dated April 22, 1902, and as to different specific methods in our United States Letters Patent, dated May 13, 1902, Nos. 699,933 and 700,099.

We desire it clearly understood that while we specify fatty sulfonated or sulfo-oleaginous defecating or cleansing liquids made by treating certain substances or mixtures as described, yet our invention is not limited to the substances and mixtures specifically mentioned, nor to any specific way of removing excess of acid or free acid.

We claim—

1. As a new article of manufacture, a sugar-cleansing compound, consisting of a mixture of kerosene-oil with a sulfonated derivative of a fatty body, substantially as described.

2. As a new article of manufacture, a sugar-cleansing compound, consisting of a mixture of kerosene-oil with a sulfonated derivative of cotton-seed oil, substantially as described.

3. The process of making a sulfonated sugar-cleansing compound, consisting in subjecting cotton-seed oil to the action of sulfuric acid while a low temperature is maintained, removing surplus acid from said mixture and completely separating the sulfonated body, and mixing said separated body with kerosene-oil, substantially as described.

CLAUS A. SPRECKELS.
CHARLES A. KERN.

Witnesses:
TEILE D. MÜLLER,
STEPHEN EIGER.